United States Patent [19]

Cavalli

[11] Patent Number: 4,470,793
[45] Date of Patent: Sep. 11, 1984

[54] EXTRUDER FOR EXTRUDING PASTA IN THE FORM OF A THIN CONTINUOUS STRIP

[76] Inventor: Alfredo Cavalli, Via G. Galilei, 9, Pessano con Bornago (Milan), Italy

[21] Appl. No.: 511,664

[22] Filed: Jul. 7, 1983

[30] Foreign Application Priority Data

Jul. 9, 1982 [IT] Italy ............... 22367/82[U]

[51] Int. Cl.³ .................. B29F 3/04; A21C 3/04; A21C 11/16
[52] U.S. Cl. .................. 425/376 R; 425/191; 425/467
[58] Field of Search ............... 425/467, 461, 190, 191

[56] References Cited

U.S. PATENT DOCUMENTS

| | | | |
|---|---|---|---|
| 938,047 | 10/1909 | Fish | 425/467 |
| 1,541,528 | 6/1925 | Royle | 425/467 |
| 1,725,959 | 8/1929 | Heath | 425/467 |
| 2,512,488 | 6/1950 | Lacotte et al. | 425/191 |
| 3,008,434 | 11/1961 | Moldari | 425/461 |
| 3,299,474 | 1/1967 | Ashworth | 425/467 |
| 3,436,952 | 4/1969 | Hajikano | 425/191 |

*Primary Examiner*—Willard E. Hoag
*Attorney, Agent, or Firm*—Hubbell, Cohen, Stiefel & Gross

[57] ABSTRACT

An extruder for extruding pasta in the form of a continuous thin strip in a pasta-making machine, more particularly for domestic use.

The extruder comprises a first tubular body and a coaxial inner jacket defining a circular opening of predetermined diameter "D". A second tubular body having a flange comprises a coaxial cylindrical body held in position by a number of rigid radial elements defining passages and is engaged coaxially in body. The outer diameter "d" of body is less than the diameter "D" and defines a slot for extruding pasta in the form of a continuous tube which is automatically cut along a generatrix by a tooth secured to the outer surface of body.

The components of extruder can be axially dismantled in order to remove residues of pasta after the extrusion process. Jacket also has projections which slow down the pasta as it travels in the passage, thus bringing it to the same speed as the pasta encountering the radial elements.

13 Claims, 4 Drawing Figures

EXTRUDER FOR EXTRUDING PASTA IN THE FORM OF A THIN CONTINUOUS STRIP

The invention relates to an extruder for extruding pasta in the form of a thin continuous strip in a pasta-making machine which is more particularly though not necessarily of the domestic kind.

Known domestic-type extruders used in pasta-making machines comprise a disc, usually bronze, formed with at least one arcuate slot through which the pasta is extruded, the disc being pressed by a threaded sleeve against the mouth of the compression cylinder in the machine.

Known extruders of the aforementioned kind are generally satisfactory and mainly serve their purpose, but have some disadvantages. Firstly the disc, which is rather expensive to make, must have appreciable thickness to withstand the pressure of the pasta, and the arcuate slots must not be too wide. This increases the weight and reduces the width of the strip of pasta coming out of the arcuate slots. A narrow strip is clearly of limited use in the preparation of food. After being used, furthermore, the known extruders are difficult to clean since it is difficult to remove residues of pasta imprisoned in the slots, although of course they must be removed for hygienic reasons.

The object of the invention is to construct an extruder for extruding pasta in the form of a continuous strip in pasta-making machines, the extruder having structural and operating characteristics which eliminate the disadvantages of prior art extruders comprising a disc.

This purpose is achieved by an extruder of the aforementioned kind, characterized in that it comprises:

A first tubular body having an edge projecting radially outwards at the end to be connected to the compression cylinder of the pasta-making machine, and formed with a circular aperture of predetermined diameter at the opposite end, A second tubular body having a radial flange extending outwards at one end, the second body being coaxially and removably inserted into the first body so that the flange is in axial contact with the radial edge of the first body, A cylindrical body inside and coaxial of the second tubular body, the cylindrical body extending coaxially in the first tubular body as far as the circular aperture therein and having an outer diameter depending on the thickness of the required strip of paste and less than the diameter of the circular aperture, A number of angularly spaced rigid radial rod-like elements firmly securing the cylindrical body to the second tubular body, and A tooth secured to the cylindrical body and projecting radially from its surface and extending to the inner surface of the circular aperture in the first tubular body.

Other features and advantages of the extruder according to the invention will be clear from the description of a preferred embodiment, given by way of non-limitative example with reference to the accompanying drawings in which.

Figure 1:
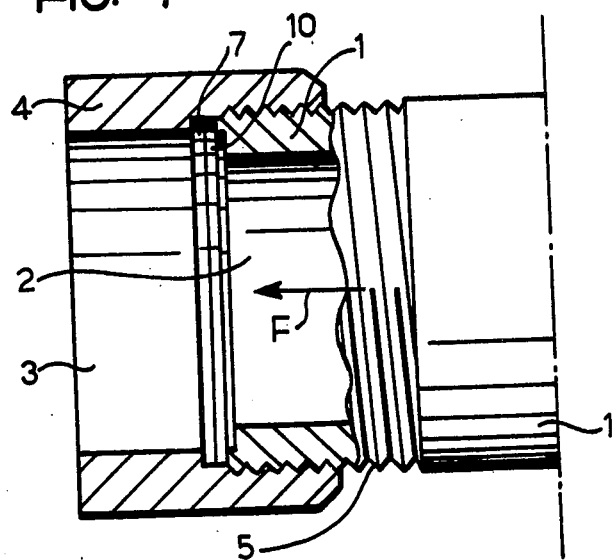
FIG. 1 is a view partly in section of the end part of the compression cylinder of a conventional pasta-making machine fitted with an extruder according to the invention.

With reference to the accompanying drawings, more particularly FIG. 1, reference 1 denotes the end of the compression cylinder of a pasta-making machine; the machine is not shown in further detail since it is conventional and not strictly relevant to the invention.

Compression cylinder 1 terminates in a mouth 2 for delivering pasta, which advances in the direction shown by arrow F.

The extruder 3 according to the invention, shown in side view in FIG. 1 is mounted in conventional manner opposite mouth 2.

Extruder 3 is secured by a nut 4 which engages the threaded part 5 of compression cylinder 1 and externally surrounds extruder 3.

Figure 2:
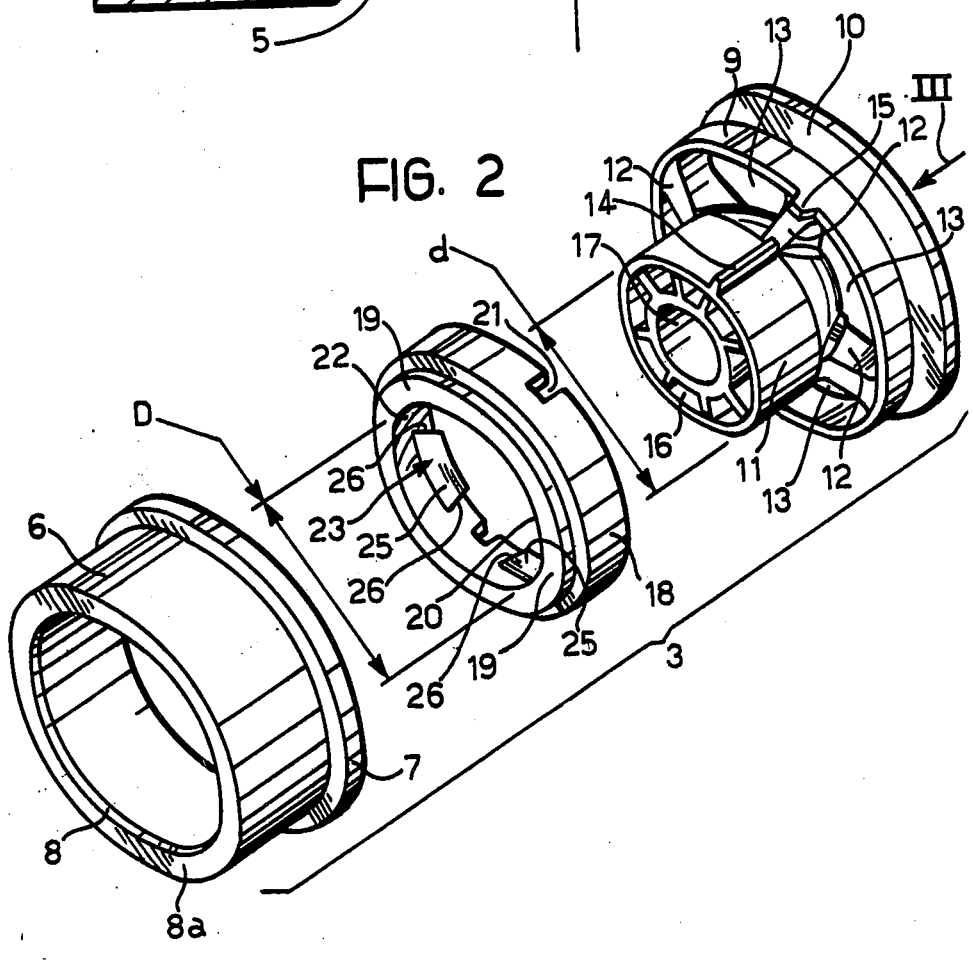
FIG. 2 is an enlarged perspective view of an extruder according to the invention.
Figure 3:
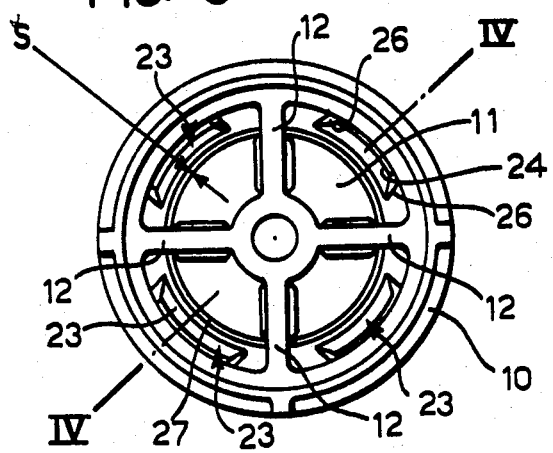
FIG. 3 is a view of the extruder in FIG. 1 shown in the direction of arrow III.

As shown in FIG. 2, extruder 3 comprises a first tubular member or body 6 made of metal, e.g. bronze, and having a radial edge 7 projecting outwards. Edge 7 is positioned at the end for securing to the mouth 2 of compression cylinder 1.

At the opposite end, body 6 has a circular aperture 8 defined by a radial edge 8a facing inwards, the purpose of which will become apparent hereinafter.

Extruder 3 also comprises a second tubular member or body 9 formed with a radial flange 10 projecting outwards and a cylindrical member or body 11 coaxial with body 9 and connected thereto by a number of angularly spaced-apart rigid rod-like elements 12 which co-operate to define axial passages 13. The outer surface of body 11 has a radial tooth 14, the purpose of which will become clear hereinafter. The front edge opposite flange 10 of body 9 has a pair of diametrically opposed axial teeth 15. To reduce the weight, cylindrical body 11 is also formed with internal cavities 16 and 17. The inner wall of body 6, in the preferred embodiment shown in the drawings, comprises a tubular jacket 18 ending against the radial edge 8a. End 19 is received in aperture 8 and is formed with an aperture 20 having a predetermined diameter "D". The opposite end of jacket 18 is formed with a pair of axial recesses adapted to engage with teeth 15 of body 9 when the extruder is assembled, such engagement ensuring correct angular location of body 9 to jacket 18 upon their axial engagement in one another. Body 11 has an axial length such that its free end extends as far as the opening 20 in sleeve 18, and its outer diameter "d", depending on the desired thickness "S" of the extruded strip of pasta, is less than the diameter "D" of the opening 20 in sleeve 18.

Tooth 14 has a radial length such that it intimately engages with the inner cylindrical wall 22 of jacket 18.

Wall 22 has angularly spaced projections 23 out of alignment with the rigid radial elements 12 connecting body 11 to body 9. Projections 23 comprise a radial step 24 near the inner end of body 9 and a connecting surface 25 near aperture 20.

Projections 23 also have a substantially trapezoidal shape, having sloping edges 26 which diverge towards aperture 20.

Inside body 6, jacket 18 bounds an annular seat receiving body 9 (FIG. 4), whose flange 10 is in axial contact with the radial edge 7 of body 6.

In a constructional variant of the extruder according to the invention, jacket 18 can be omitted and replaced by an inner portion integral with element 6 whose wall thus has the same constructional characteristics as jacket 18.

In another variant of extruder 3, projections 23 can also be omitted, although they improve the efficiency of the extruder.

Preferably, the bodies 9 and 11 and jacket 18 are made of non-toxic plastics.

Figure 4:
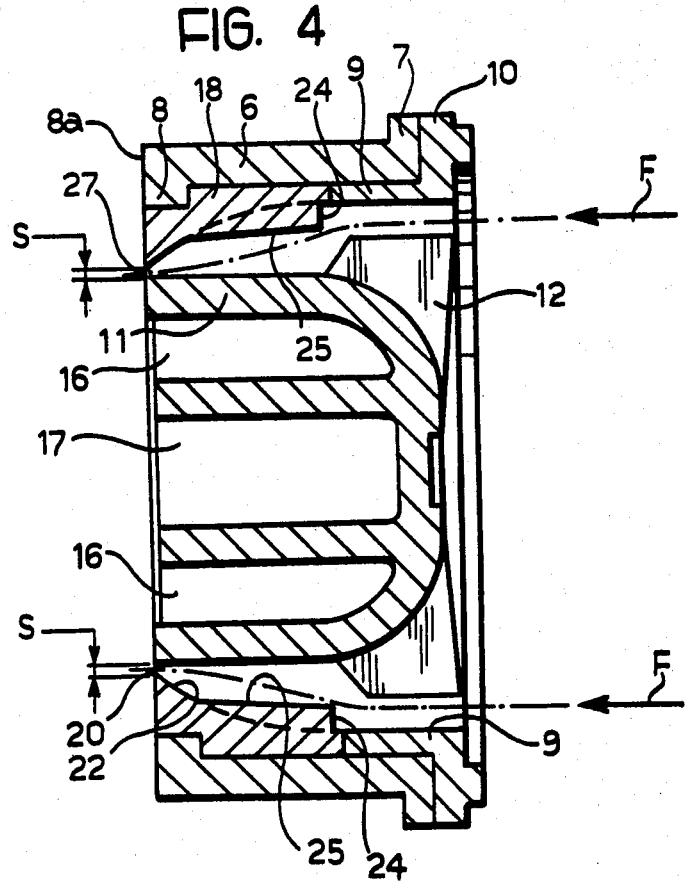
FIG. 4 is a view in section of a detail of an extruder according to the invention, on the line IV—IV in FIG. 3.

In operation the extruder 3, with its elements engaged coaxially in one another as illustrated in FIG. 4, is received in mouth 2 of compression cylinder 1 and secured by nut 4, which presses axially on edge 7 of body 6.

The pasta, moving in the direction of arrow F, enters the passages 13 left free by the radial elements 12 of body 9, travels through the gap between the outer surface of body 11 and the inner wall 22 of jacket 18 and issues through the front gap 27 of thickness S equal to (D−d)/2, in the form of a thin tubular element longitudinally cut by the radial tooth 14, which operates along a generatrix.

On leaving the extruder, the tubular pasta element opens and becomes a flat strip.

When the pasta is travelling along the extruder it meets less resistance near the passages 13 left free by the radial elements 12 and can therefore be extruded faster than downstream of the regions in line with the elements 12. Consequently, projections 13 have a compensating effect by slowing down the pasta near passages 13.

After use, extruder 3 can be dismantled by being taken apart axially and any pasta still trapped inside can be removed easily and rapidly, thus ensuring complete cleaning.

Of course, strip thickness can be varied if body 9 is replaced by a cylindrical body 11 having a different diameter "d" of if jacket 18 is replaced by a jacket having a different diameter "D".

What I claim is:

1. An extruder for extruding pasta in the form of a thin continuous strip using pasta-making machinery, more particularly though not exclusively of the domestic kind, comprising:

A first tubular body having an edge projecting radially outwards at the end to be connected to the compression cylinder of the pasta-making machine, and formed with a circular aperture of predetermined diameter at the opposite end, A second tubular body having a radial flange extending outwards at one end, the second body being coaxially and removably inserted into the first body so that the flange is in axial contact with the radial edge of the first body, A cylindrical body inside and coaxial of the second tubular body, the cylindrical body extending coaxially in the first tubular body as far as the circular aperture therein and having an outer diameter depending on the thickness of the required strip of pasta and less than the diameter of the circular aperture, A number of angularly spaced rigid radial rod-like elements firmly securing the cylindrical body to the second tubular body, and A tooth secured to the cylindrical body and projecting radially from its surface and extending to the inner surface of the circular aperture in the first tubular body.

2. An extruder according to claim 1, wherein the inner wall of the first tubular body is formed with an annular seat in which the second tubular body is disposed.

3. An extruder according to claim 1, wherein the inner wall of the first tubular body, in the axial portion between the circular aperture and the section adjacent the inner end of the second tubular body, has angularly-spaced projections positioned outside the axial alignment of the radial rigid elements for securing the cylindrical body to the second tubular body.

4. An extruder according to claim 2, wherein each projection comprises a radial step near the inner end of the second tubular body and a connecting surface near the circular aperture of the first annular body.

5. An extruder according to claim 3 or 4, wherein each projection has a substantially trapezoidal shape, the oblique sides diverging towards the aforementioned aperture in the first tubular body.

6. An extruder for extruding pasta in the form of a thin continuous strip, using a pasta-making machine, more particularly though not exclusively of the domestic kind, comprising:

A first tubular body formed with an edge projecting radially outwards at the end to be connected to the compression cylinder of the pasta-making machine, and an end projecting radially towards the interior at the opposite end, A tubular jacket coaxially inserted into the first body against the aforementioned edge projecting radially towards the interior, the jacket defining a circular aperture of predetermined diameter corresponding to that end of the first tubular body which is formed with the edge, A second tubular body having a radial flange facing outwards at one end, the second tubular body being coaxially and removably inserted into the first body with the flange in axial contact with the radial edge of the first body facing the exterior and extending axially with its inner end in contact with the adjacent end of the tubular jacket, A cylindrical body inside the second tubular body and coaxial therewith, the cylindrical body extending coaxially in the jacket as far as the circular aperture or predetermined diameter and having an outer diameter, depending on the desired thickness of the strip of pasta, less than the diameter of the circular aperture, A number of angularly-spaced rigid rod-like elements rigidly securing the cylindrical body to the second tubular body, and A tooth secured to the cylindrical body, projecting radially from its outer surface and extending as far as the inner surface of the circular aperture in the jacket.

7. An extruder according to claim 6, wherein the inner wall of the jacket, in the axial portion between the circular aperture and the cross-section adjacent the end of the second tubular body inside the first, is formed with angularly spaced-apart projections positioned outside the axial alignment of the rigid radial rod-like elements connecting the cylindrical body to the second tubular body.

8. An extruder according to claim 7, wherein each of the aforementioned projections is a radial step near the end of the second tubular body inside the first and also comprises a connecting surface near the circular aperture in the jacket.

9. An extruder according to claim 7 or 8, wherein each projection has a substantially trapezoidal shape, the sloping sides of which diverge towards the circular aperture in the jacket.

10. An extruder according to claim 6, comprising axial engagement means between the facing edges of the jacket and the second tubular body, for reciprocal angular positioning.

11. An extruder according to claim 1 or 6, wherein the first tubular member is made of metal.

12. An extruder according to claim 1 or 6, wherein the second tubular member, the cylindrical member and the rigid radial rod-like elements connecting the cylindrical body to the second tubular body, are made of non-toxic plastics.

13. An extruder according to claim 6, wherein the jacket is made of non-toxic plastics.

* * * * *